US010551502B2

United States Patent
Buehs et al.

(10) Patent No.: US 10,551,502 B2
(45) Date of Patent: Feb. 4, 2020

(54) POSITIONING SYSTEM FOR DETERMINING THE POSITION OF A VEHICLE IN A CHARGING STATION

(71) Applicant: SIEMENS MOBILITY GMBH, Munich (DE)

(72) Inventors: Florian Buehs, Berlin (DE); Andre Rompe, Berlin Kaulsdorf (DE)

(73) Assignee: Siemens Mobility GmbH, Munich (DE)

( * ) Notice: Subject to any disclaimer, the term of this patent is extended or adjusted under 35 U.S.C. 154(b) by 280 days.

(21) Appl. No.: 15/313,578

(22) PCT Filed: May 28, 2015

(86) PCT No.: PCT/EP2015/061788
§ 371 (c)(1),
(2) Date: Nov. 23, 2016

(87) PCT Pub. No.: WO2015/185429
PCT Pub. Date: Dec. 10, 2015

(65) Prior Publication Data
US 2017/0212237 A1    Jul. 27, 2017

(30) Foreign Application Priority Data

Jun. 5, 2014   (DE) .......................... 10 2014 210 759

(51) Int. Cl.
*G01S 17/48* (2006.01)
(52) U.S. Cl.
CPC .................................... *G01S 17/48* (2013.01)

(58) Field of Classification Search
CPC ..... G01S 17/48; G01S 17/42; G06K 2209/09; G06K 2209/15; G06K 2209/19;
(Continued)

(56) References Cited

U.S. PATENT DOCUMENTS 5,323,098 A   6/1994   Hamaguchi et al.
5,654,621 A   8/1997   Seelig
(Continued)

FOREIGN PATENT DOCUMENTS

CN   103580102 A   2/2014
DE   4236286 A1   5/1994
(Continued)

*Primary Examiner* — Richard A Goldman
(74) *Attorney, Agent, or Firm* — Laurence Greenberg; Werner Stemer; Ralph Locher

(57) ABSTRACT

A positioning system for determining the position of a vehicle when driving into a charging station for charging an energy accumulator of the vehicle includes a vehicle-side marking having at least one marking property changing in the longitudinal direction of the vehicle. A route-side sensor device measures a distance from the marking to the sensor device when the vehicle passes the sensor device and generates a distance signal indicating a distance from the marking to the sensor device in the transverse direction of the vehicle. The sensor device reads out the marking property in the longitudinal direction of the vehicle and generates a longitudinal vehicle direction signal indicating the position of the marking and/or the vehicle relative to the sensor device in the longitudinal direction of the vehicle. A charging station, a vehicle and a method for determining the position of a vehicle, are also provided.

10 Claims, 5 Drawing Sheets

(58) Field of Classification Search
CPC ........... G60K 2209/21; G60K 2209/23; G60K 2209/25; G60K 2209/27; G08G 1/017; G08G 1/0175; G08G 1/04; G08G 1/042; B60L 11/18; B60L 11/1824; B60L 11/1833; B60L 11/1835; B60L 11/1846; B60L 2200/18; B60L 2230/10; Y02T 10/7005; Y02T 10/7088; Y02T 90/121; Y02T 90/125; Y02T 90/128; Y02T 90/14; Y02T 90/163; Y02T 90/169; Y04S 30/14
USPC ............................ 701/300; 702/150; 382/105
See application file for complete search history.

(56) References Cited

U.S. PATENT DOCUMENTS

| | | | |
|---|---|---|---|
| 5,903,355 A | 5/1999 | Schwarz | |
| 8,358,423 B2 | 1/2013 | Funken et al. | |
| 9,103,655 B2 | 8/2015 | Enthaler et al. | |
| 9,122,948 B1* | 9/2015 | Zhu | G05D 1/0214 |
| 9,365,128 B2 | 6/2016 | Sarkar et al. | |
| 9,410,823 B2 | 8/2016 | Widmer et al. | |
| 9,792,473 B2* | 10/2017 | Luo | G06K 19/07309 |
| 2005/0150944 A1* | 7/2005 | Melick | G06K 7/10544 |
| | | | 235/375 |
| 2005/0194435 A1* | 9/2005 | Smith | G06K 19/06009 |
| | | | 235/380 |
| 2005/0270178 A1* | 12/2005 | Ioli | G06Q 20/40 |
| | | | 340/932.2 |
| 2007/0030122 A1* | 2/2007 | Rickrode | B60R 25/24 |
| | | | 340/5.72 |
| 2007/0108288 A1* | 5/2007 | Caskey | G01B 11/25 |
| | | | 235/462.08 |
| 2007/0145138 A1* | 6/2007 | Snyder | G06K 7/10544 |
| | | | 235/462.01 |
| 2007/0229307 A1* | 10/2007 | Pawlenko | G01S 7/412 |
| | | | 340/933 |
| 2008/0000074 A1* | 1/2008 | Martinez | G06K 17/00 |
| | | | 29/593 |
| 2008/0000979 A1* | 1/2008 | Poisner | G06K 19/06046 |
| | | | 235/462.01 |
| 2008/0017722 A1* | 1/2008 | Snyder | G06Q 10/00 |
| | | | 235/494 |
| 2008/0174436 A1* | 7/2008 | Landt | G06K 19/0704 |
| | | | 340/572.7 |
| 2009/0289113 A1* | 11/2009 | Vilnai | B67D 7/34 |
| | | | 235/381 |
| 2010/0116879 A1* | 5/2010 | Lourenco | G06Q 40/00 |
| | | | 235/380 |
| 2010/0228585 A1* | 9/2010 | Bradley | G06K 17/00 |
| | | | 705/38 |
| 2010/0308965 A1* | 12/2010 | Weitzhandler | B60K 15/04 |
| | | | 340/10.1 |
| 2011/0211727 A1* | 9/2011 | Costa | G06F 21/35 |
| | | | 382/100 |
| 2012/0066506 A1* | 3/2012 | Nielsen | G08B 5/22 |
| | | | 713/185 |
| 2012/0187757 A1 | 7/2012 | Wechlin et al. | |
| 2012/0203410 A1 | 8/2012 | Wechlin et al. | |
| 2012/0230548 A1* | 9/2012 | Calman | G06K 9/00791 |
| | | | 382/104 |
| 2013/0117078 A1* | 5/2013 | Weik, III | G06Q 10/00 |
| | | | 705/13 |
| 2013/0215433 A1 | 8/2013 | Crampton | |
| 2014/0191718 A1* | 7/2014 | Reineccius | B60L 53/305 |
| | | | 320/108 |
| 2014/0263629 A1* | 9/2014 | McQuade | G07F 7/12 |
| | | | 235/381 |
| 2014/0379385 A1* | 12/2014 | Duncan | G06Q 40/08 |
| | | | 705/4 |
| 2015/0049914 A1* | 2/2015 | Alves | G06K 9/033 |
| | | | 382/105 |
| 2015/0227959 A1* | 8/2015 | Qu | G06Q 30/0239 |
| | | | 235/375 |
| 2015/0242855 A1* | 8/2015 | Vilnai | B67D 7/34 |
| | | | 705/44 |
| 2015/0324681 A1* | 11/2015 | Mats | G06K 19/07766 |
| | | | 235/492 |
| 2016/0013559 A1* | 1/2016 | Yewen | H01Q 9/04 |
| | | | 343/749 |
| 2016/0039436 A1* | 2/2016 | Bhagwatkar | B64C 39/024 |
| | | | 348/148 |
| 2017/0148102 A1* | 5/2017 | Franke | G06Q 10/20 |
| 2017/0148315 A1* | 5/2017 | Jung | G08G 1/04 |
| 2017/0164178 A1* | 6/2017 | Anjum | G08G 1/017 |
| 2017/0323505 A1* | 11/2017 | Gaddam | G07C 9/00896 |
| 2017/0345304 A1* | 11/2017 | Oesterling | G08G 1/149 |
| 2018/0010954 A1* | 1/2018 | Lowndes | G01G 19/12 |
| 2018/0234161 A1* | 8/2018 | Ma | H04B 7/15564 |

FOREIGN PATENT DOCUMENTS

| | | |
|---|---|---|
| DE | 69119168 T2 | 8/1996 |
| DE | 102009033236 A1 | 1/2011 |
| DE | 102009049432 A1 | 4/2011 |
| DE | 102012015262 A1 | 2/2014 |
| EP | 2692573 A2 | 2/2014 |
| TW | 201415064 A | 4/2014 |
| WO | 2009124565 A1 | 10/2009 |
| WO | 2011006884 A2 | 1/2011 |
| WO | 2011139680 A2 | 11/2011 |
| WO | 2012049438 A1 | 4/2012 |

* cited by examiner

POSITIONING SYSTEM FOR DETERMINING THE POSITION OF A VEHICLE IN A CHARGING STATION

BACKGROUND OF THE INVENTION

Field of the Invention

The invention relates to a positioning system for determining the position of a vehicle as it enters a charging station, which is suitable for charging an energy accumulator of the vehicle.

It is known that electrical energy accumulators of hybrid vehicles or of exclusively electrically-driven vehicles, for example buses for public transportation, can be charged at appropriately equipped stopping points, referred to hereafter as charging stations. To be able to carry out the charging procedure automatically, the position of the vehicle inside the charging station is to be known as accurately as possible.

BRIEF SUMMARY OF THE INVENTION

The invention is accordingly based on the object of specifying a positioning system which is suitable for determining the position of a vehicle inside a charging station, in particular for determining the position as the vehicle enters the charging station. The invention is also based on using the system to carry out a position determination particularly simply, but nonetheless very accurately.

This object is achieved according to the invention by a positioning system having the features described below. Advantageous embodiments of the positioning system according to the invention are also described below.

It is accordingly provided according to the invention that the positioning system has a vehicle-side marking, in which at least one marking property changes in the vehicle longitudinal direction, and the positioning device has on the charging station side, a sensor device which—as the vehicle travels past the sensor device, in particular as the vehicle enters the charging station—measures the distance of the marking from the sensor device and generates a distance signal, which indicates the distance of the marking from the sensor device in the vehicle transverse direction, and reads out the marking property in the vehicle longitudinal direction and generates a vehicle longitudinal direction signal, which indicates the position of the marking and/or the vehicle in relation to the sensor device in the vehicle longitudinal direction.

An essential advantage of the positioning system according to the invention can be considered that a determination of the position of the vehicle inside the charging station can be ascertained both in the vehicle longitudinal direction and also in the vehicle transverse direction on the basis of a marking, in which a marking property changes solely in the vehicle longitudinal direction.

The marking property, which is dependent on the vehicle longitudinal direction, is preferably determined by the surface topology or at least also by the surface topology of the marking.

It is considered to be particularly advantageous if the marking property, which is dependent on the vehicle longitudinal direction, is determined by the surface profile of the marking in the vehicle Y direction and the vehicle longitudinal direction signal is generated by analyzing the distance signal. In this embodiment, the distance signal is used, in other words, to generate a two-dimensional position signal.

The surface topology of the marking in the vehicle Y direction preferably has a height coding along the vehicle X direction, on the basis of which the position of the marking can be determined in the vehicle X direction in relation to the sensor device.

The surface topology of the marking is preferably bent about a bending axis, which corresponds to the vehicle longitudinal axis or is parallel to the vehicle longitudinal axis. With such an embodiment, reliable marking recognition is also still possible if the vehicle is inclined, for example to facilitate the entry of passengers when the vehicle is at a standstill.

The marking property, which is dependent on the vehicle longitudinal direction, of the marking preferably has, at the front marking end viewed in the forward travel direction of the vehicle, a starting feature or a starting sequence, on the basis of which the sensor device recognizes the beginning of the marking traveling past.

A particularly simple marking can advantageously be formed by a perforated and/or slotted screen, which contains one or more holes and/or slots, or can at least also contain such a perforated and/or slotted screen.

The marking can advantageously additionally have a coding which identifies the vehicle. In the case of such an embodiment, the sensor device preferably recognizes the vehicle on the basis of the coding.

The sensor device is preferably a sensor device which operates in a contactless manner. The sensor device preferably operates optically, inductively, magnetically, and/or capacitively.

It is considered to be particularly advantageous if the sensor device determines the distance between the marking and the sensor device by means of a triangulation method, in particular a laser triangulation method, or by means of a radiation runtime method.

The invention additionally relates to a charging station, which is suitable for charging an energy accumulator of a vehicle. With respect to such a charging station, it is provided according to the invention that the charging station has a sensor device, which, as the vehicle enters the charging station, measures the distance of a vehicle-side marking from the sensor device and generates a distance signal, which indicates the distance of the marking from the sensor device in the vehicle transverse direction, and reads out a marking property in the vehicle longitudinal direction and generates a vehicle longitudinal direction signal, which indicates the position of the marking and/or the vehicle in relation to the sensor device in the vehicle longitudinal direction.

With respect to the advantages of the charging station according to the invention, reference is made to the above statements in conjunction with the positioning system according to the invention, because the advantages of the positioning system according to the invention substantially correspond to those of the charging station according to the invention.

The invention additionally relates to a vehicle, which also has at least one electric drive and an energy accumulator which is chargeable via a charging station. With respect to such a vehicle, it is provided according to the invention that the vehicle has a vehicle-side marking with a marking property which is dependent on the vehicle longitudinal direction, on the basis of which a vehicle longitudinal direction signal, which indicates the position of the marking and/or the vehicle in relation to a sensor device of the charging station in the vehicle longitudinal direction, and a distance signal, which indicates the distance of the marking and/or the vehicle from the sensor device in the vehicle transverse direction, can be generated.

Reference is made to the explanations above in conjunction with the positioning system according to the invention with respect to the advantages of the vehicle according to the invention.

The invention additionally relates to a method for determining the position of a vehicle as it enters a charging station, which is suitable for charging an energy accumulator of the vehicle.

It is provided according of the invention with respect to such a method that as the vehicle travels past a sensor device of the charging station, the distance of a vehicle-side marking from the sensor device of the charging station in the vehicle transverse direction is measured and a distance signal is generated, which indicates the distance of the marking and/or the vehicle from the sensor device of the charging station in the vehicle transverse direction, and a marking property, which is dependent on the vehicle longitudinal direction, of the vehicle-side marking is read out and a vehicle longitudinal direction signal is generated, which indicates the position of the marking and/or the vehicle in relation to the sensor device of the charging station in the vehicle longitudinal direction.

Reference is made to the above explanations in conjunction with the positioning system according to the invention with respect to the advantages of the method according to the invention.

It is considered to be particularly advantageous if the marking property, which is dependent on the vehicle longitudinal direction, is determined by the surface profile of the marking in the vehicle Y direction and the vehicle longitudinal direction signal is generated by analyzing the distance signal.

BRIEF DESCRIPTION OF THE SEVERAL VIEWS OF THE DRAWING

The invention will be explained in greater detail hereafter on the basis of exemplary embodiments; in the exemplary figures.

DESCRIPTION OF THE INVENTION

In the figures, the same reference signs are always used for identical or comparable components for the sake of comprehensibility.

Figure 1:
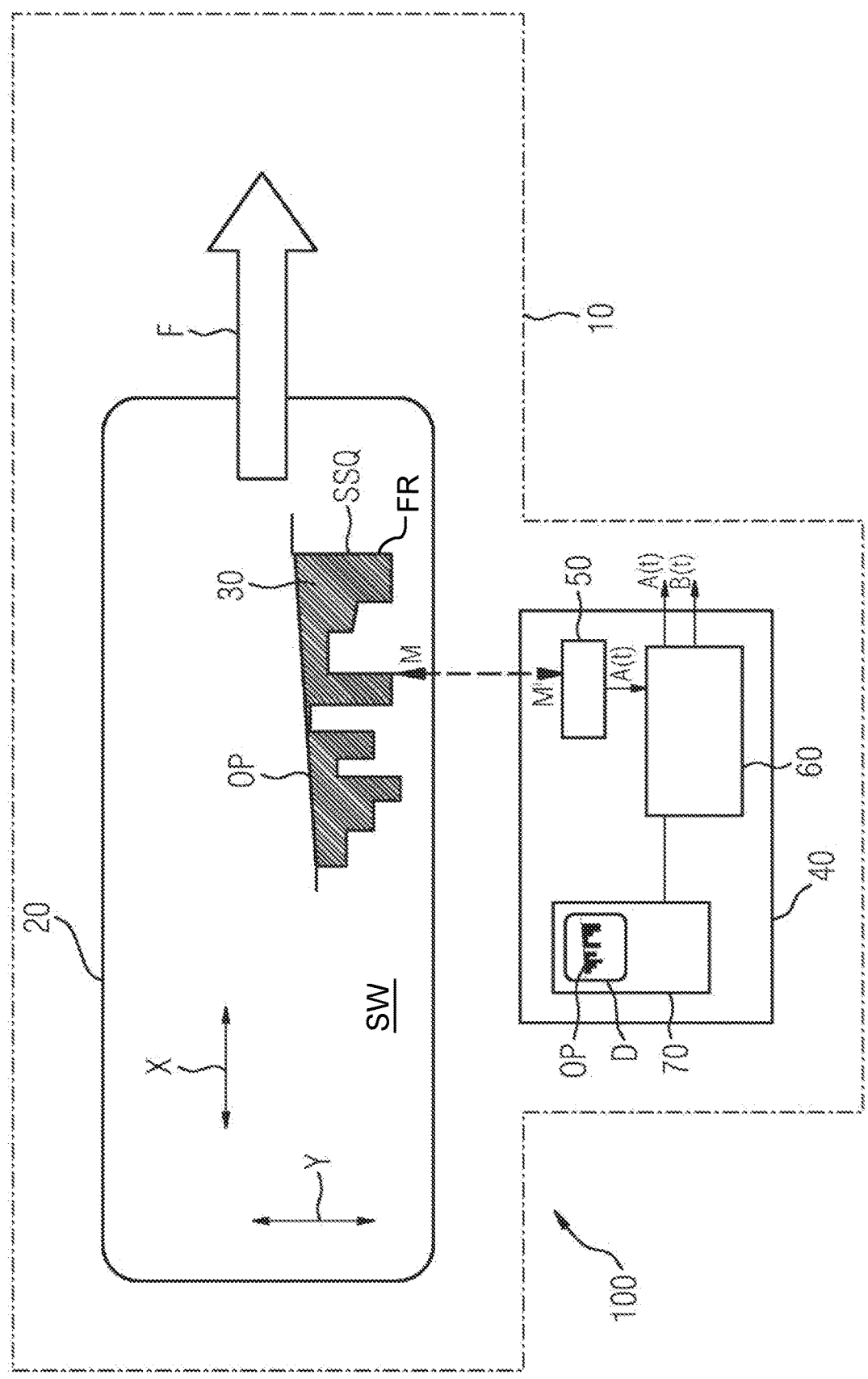
FIG. 1 shows an exemplary embodiment of a charging station according to the invention, into which a vehicle equipped with a marking is entering a charging station.

FIG. 1 shows a charging station 10, into which a vehicle 20 enters along a travel direction F, which is predefined for the charging station 10. The vehicle 20 is provided with a marking 30, in which a marking property changes in the vehicle longitudinal direction X. In the exemplary embodiment according to FIG. 1, the marking 30 has a surface topology or a surface profile OP, the height of which—viewed along the vehicle transverse direction or the vehicle Y direction—changes along the vehicle longitudinal direction X and therefore mathematically represents a function OP(X) of the longitudinal coordinate X.

The marking 30 can be arranged, for example, on the vehicle roof of the vehicle 20, on the right side wall SW viewed in the travel direction F—of the vehicle, or even in the region of the vehicle floor of the vehicle 20.

For positioning the vehicle 20 inside the charging station 10, the charging station 10 is equipped with a sensor device 40, which comprises a sensor 50, a computer device 60, and a memory 70.

Figure 5:
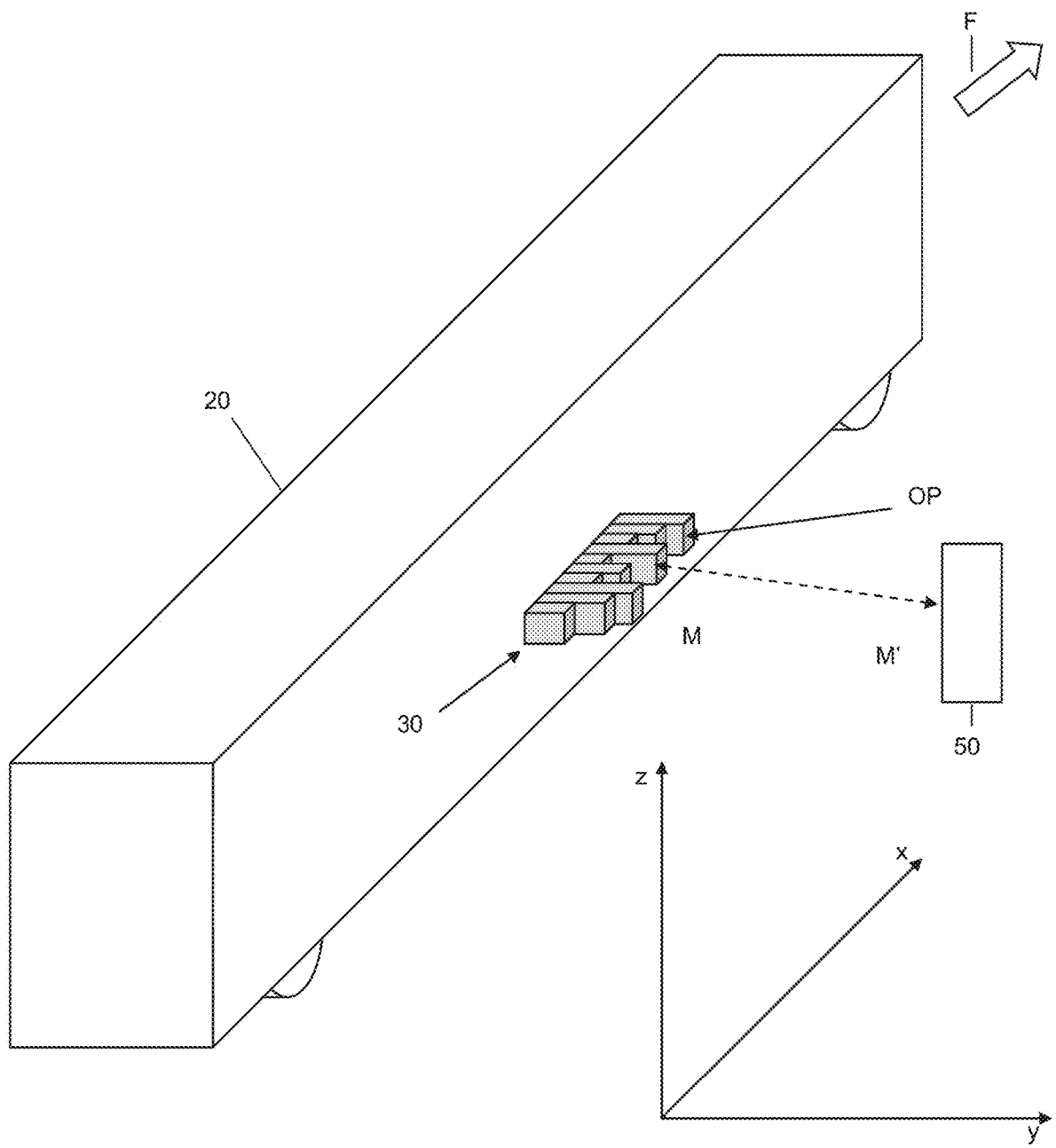
FIG. 5 shows a diagrammatic 3-D view illustrating the relationship between the marking on the vehicle and the sensor.

FIG. 5 shows a diagrammatic 3-D view illustrating the relationship between the marking 30 on the vehicle 20 and the sensor 50.

The sensor 50 preferably operates in a contactless manner, for example optically, inductively, magnetically, and/or capacitively. For example, the sensor 50 can be a laser-based sensor, which determines the distance between the sensor 50 and the vehicle-side marking 30 by means of a triangulation method, in particular a laser triangulation method, or by means of a laser radiation runtime method.

In FIG. 1, the operating principle of the sensor 50 is indicated by means of a measuring beam M, which is emitted by the sensor 50 in the direction of vehicle 20, is at least partially reflected by the marking 30, and arrives back at the sensor 50 as the reflected measuring beam M'.

The charging station 10 and/or the sensor device 40 thereof can be operated as follows, for example:

If the vehicle 20 enters the charging station 10 along the travel direction F, the sensor 50 will thus recognize the occurrence of the marking 30 on the basis of the reflected measuring beam M' and will generate a distance signal A(t), which indicates the distance of the marking 30 from the sensor 50 or from the sensor device 40.

The distance signal A(t) reaches the computer device 60, which analyzes the time curve of the distance signal A(t). For this purpose, the computer device 60 reads out, from the memory 70, a data set D, which mathematically describes the horizontal surface profile OP of the geometrical marking 30.

The computer device 60 can determine, on the basis of the data set. D and/or on the basis of the read-out surface profile OP and on the basis of the time curve of the distance signal A(t), at which point on the surface profile OP the measuring beam M is located at each point in time. In other words, the computer device 60 is thus capable of generating a vehicle longitudinal direction signal, which indicates the position of the marking 30 in the vehicle longitudinal direction in relation to the measuring beam M and therefore in relation to the sensor 50 or the sensor device 40. The vehicle longitudinal direction signal is identified in FIG. 1 with the reference sign B(t).

Therefore, two position indications are provided in the sensor device 40 and/or in the computer device 60, namely the distance signal A(t) and the vehicle longitudinal direction signal B(t), which both jointly indicate the two-dimensional spatial coordinates of the marking 30 inside the charging station 10 with respect to the position of the sensor device 40.

Because the positioning of the marking 30 at or on the vehicle 20 is known beforehand and is preferably also stored in the data set D of the memory 70 or in another data set of the memory 70, and because the positioning of the sensor device 40 inside the charging station 10 is also known, the computer device 60 can, additionally or alternatively to the distance signal A(t) and the vehicle longitudinal direction signal B(t), also generate positioning signals, which describe the positioning of the marking 30 and/or other points of the vehicle 20 in relation to the sensor device 40 and/or in relation to other reference points inside the charging station 10.

In other words, the sensor device 40 in the exemplary embodiment according to FIG. 1 is capable of ascertaining, exclusively on the basis of a single measuring signal, namely the distance signal A(t), which indicates the distance of the marking 30 from the sensor device 40, the position of the vehicle 20 inside the charging station 10 both in the vehicle longitudinal direction X and also in the vehicle transverse direction Y. A single measuring signal is thus sufficient to obtain a two-dimensional position indication for the vehicle 20 inside the charging station 10.

To simplify the recognition of the marking 30 or the recognition of the entry of the vehicle 20 into the region of the sensor device 40, it is considered to be advantageous if the marking 30 has at its front end FR viewed in the vehicle longitudinal direction—a starting sequence SSQ or at least a starting feature, on the basis of which the sensor device 40 can particularly simply recognize the beginning of the marking 30 traveling past. In the exemplary embodiment according to FIG. 1, such a starting sequence is formed by an abrupt rise of the surface profile OP in the vehicle Y direction or vehicle transverse direction and a relatively long section of constant surface profile adjoining thereon.

For positioning the vehicle 20 inside the charging station 10, the sensor device 40 of the charging station 10 and the marking 30 of the vehicle 20 work together and jointly form a positioning system 100, which is suitable for determining the position of the vehicle 20 in the charging station 10.

Figure 2:
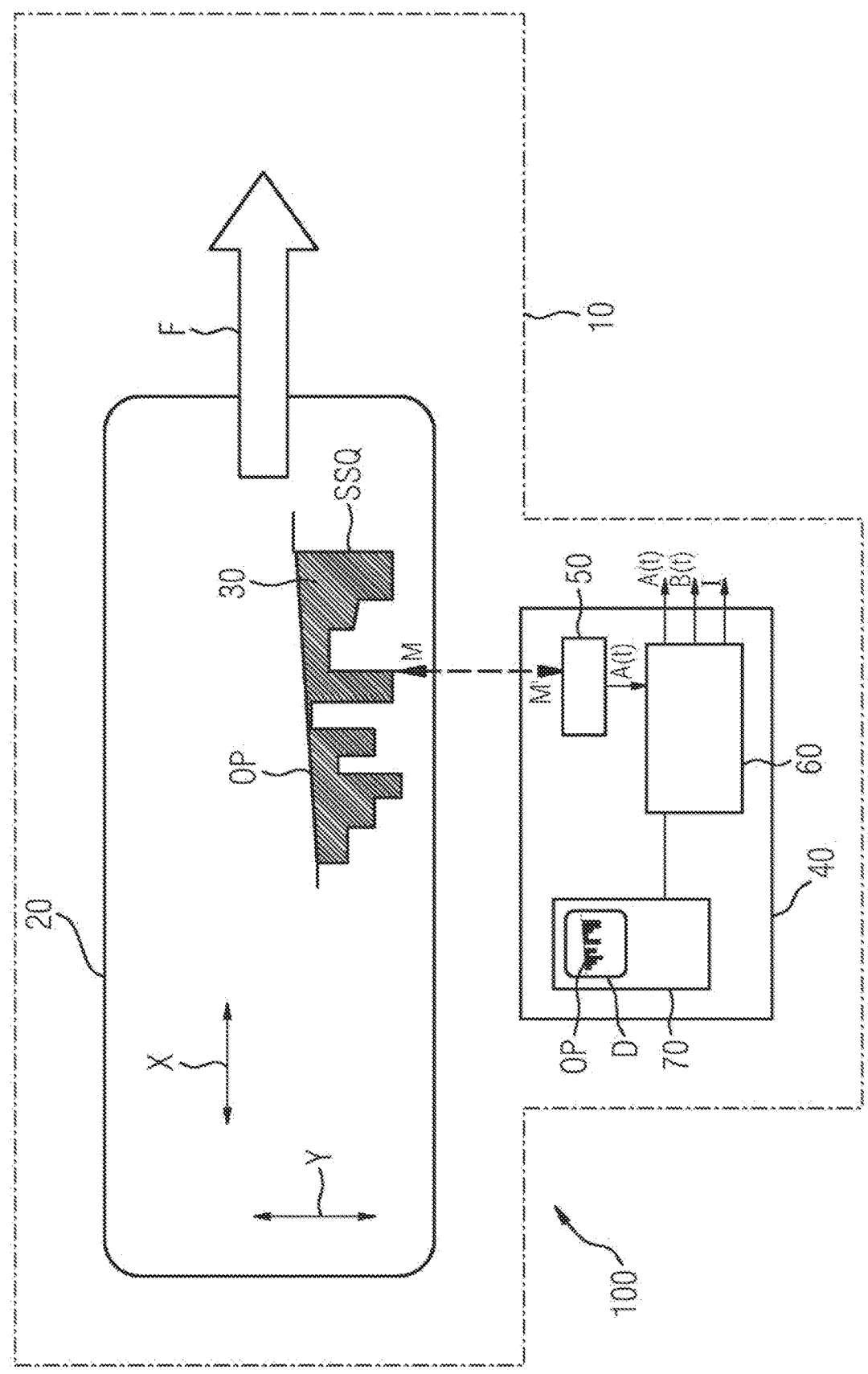
FIG. 2 shows an exemplary embodiment of a charging station according to the invention, into which a vehicle equipped with a marking is entering a charging station, wherein a sensor device additionally performs an identification of the entering vehicle.

By means of the marking property which changes in the vehicle longitudinal direction X—in the exemplary embodiment according to FIG. 1, i.e., by means of the surface profile OP changing in the vehicle longitudinal direction X—not only can the vehicle longitudinal direction signal B(t) be determined by means of the distance signal A(t), as described above in detail, but rather an identification of the vehicle 20 itself can additionally also be performed. For this purpose, inside the surface profile OP of the marking 30, a vehicle coding is preferably implemented, which is recognized by the computer device 60 during the read-out and analysis of the distance signal A(t) and is used to generate an identification signal, which identifies the respective vehicle 20. FIG. 2 shows such an exemplary embodiment of a positioning system 100, in which the sensor device 40 additionally outputs an identification signal I, which has been obtained by means of the distance signal A(t) and identifies the vehicle 20.

Figure 3:
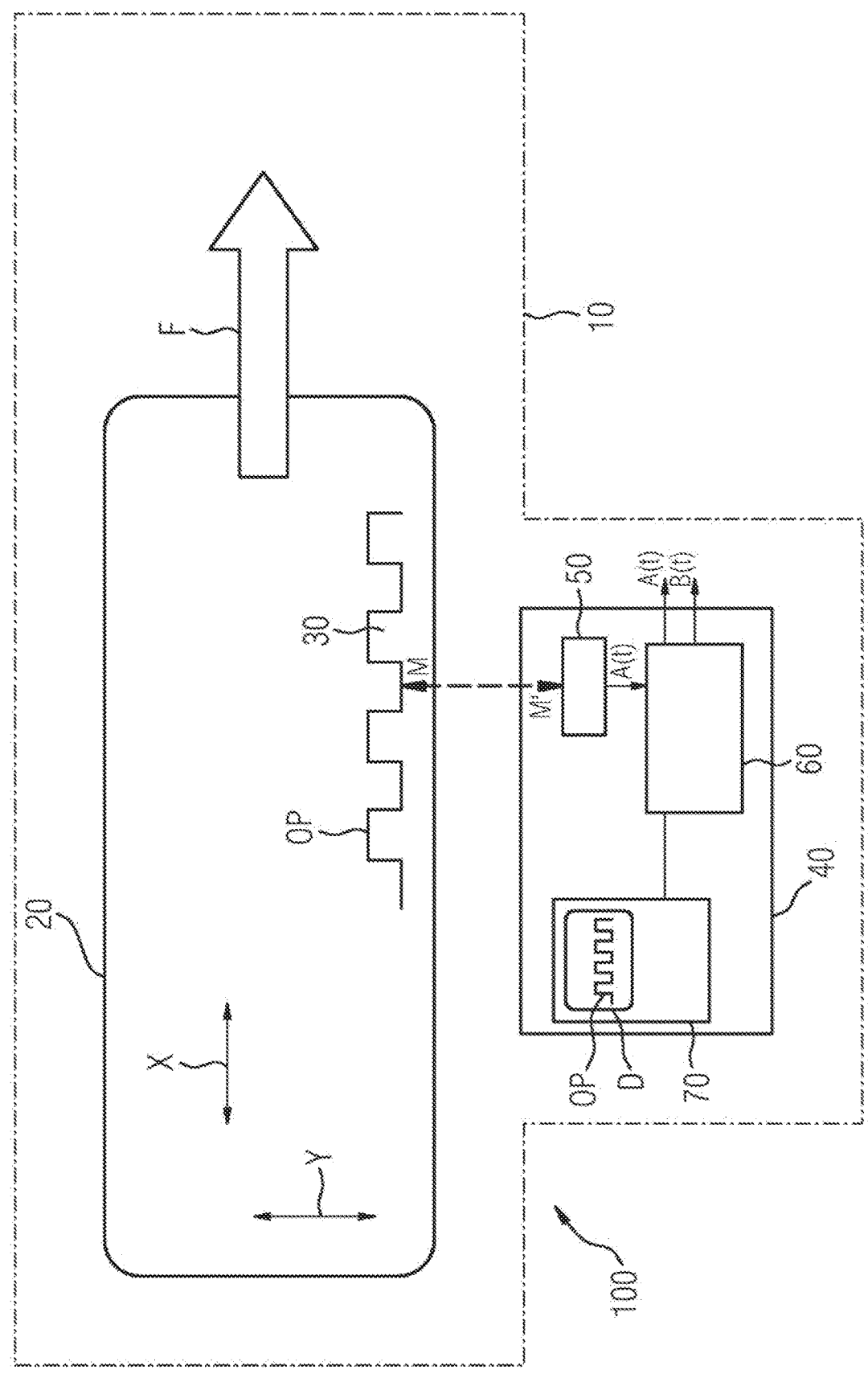
FIG. 3 shows an exemplary embodiment of a charging station according to the invention, into which a vehicle equipped with a marking which is simpler in comparison to the markings according to FIGS. 1 and 2 is entering.

FIG. 3 shows a further exemplary embodiment of a charging station 10, in which a sensor device 40 is suitable for positioning a vehicle 20 located inside the charging station 10. In the exemplary embodiment according to FIG. 3, a sensor device 40 of the charging station 10 and a marking 30 on the vehicle 20 also form a positioning system 100, using which the position of the vehicle 20 inside the charging station 10 may be determined.

In contrast to the exemplary embodiment according to FIG. 1, the surface profile OP of the vehicle-side marking 30 is kept simpler; it is thus recognizable in FIG. 3 that the vehicle-side marking 30, viewed in the vehicle transverse direction or vehicle Y direction, only has two profile heights, namely a first profile height H1 at which the surface of the marking 30 has a small distance—in comparison to the second profile height H2 to the sensor 50 of the sensor device 40, and a second profile height H2, at which the surface of the marking 30—compared to the first profile height H1 a large distance to the sensor 50 of the sensor device 40. The surface profile OP having the marking 30 can be formed, for example, by a perforated or slotted screen.

To enable recognition of the marking 30 as it travels past the vehicle 20, a data set D is preferably stored in the memory 70 of the sensor device 40 according to FIG. 3, which defines the surface profile OP of the marking 30 of the vehicle 20.

The operation of the sensor device 40 according to FIG. 3 essentially corresponds to the operation of the sensor device 40 according to FIG. 1: if the vehicle 20 enters the charging station 10 along the travel direction F, the computer device 60 will thus recognize, on the basis of the time curve of the distance signal A(t), the occurrence of the marking 30, so that—for example by counting the profile steps or profile jumps—it can determine the position of the measuring beam M on the surface profile OP of the marking 30 in the vehicle longitudinal direction.

In other words, in the exemplary embodiment according to FIG. 3, a determination of the position of the marking 30 in the vehicle longitudinal direction X is also possible solely on the basis of the distance signal A(t), although the marking 30 is embodied significantly more simply than the marking according to FIG. 1 or 2.

The sensor device 40 can emit the distance signal A(t) and the vehicle longitudinal direction signal B(t) directly at its output. Alternatively or additionally, the sensor device 40 can output, by means of the distance signal A(t) and the vehicle longitudinal direction signal B(t), other positioning signals, which indicate the position of the vehicle 20 inside the charging station 10 with respect to reference points of the vehicle 20 other than the marking 30 and/or with respect to reference points other than the position of the sensor device 40 inside the charging station 10.

Figure 4:
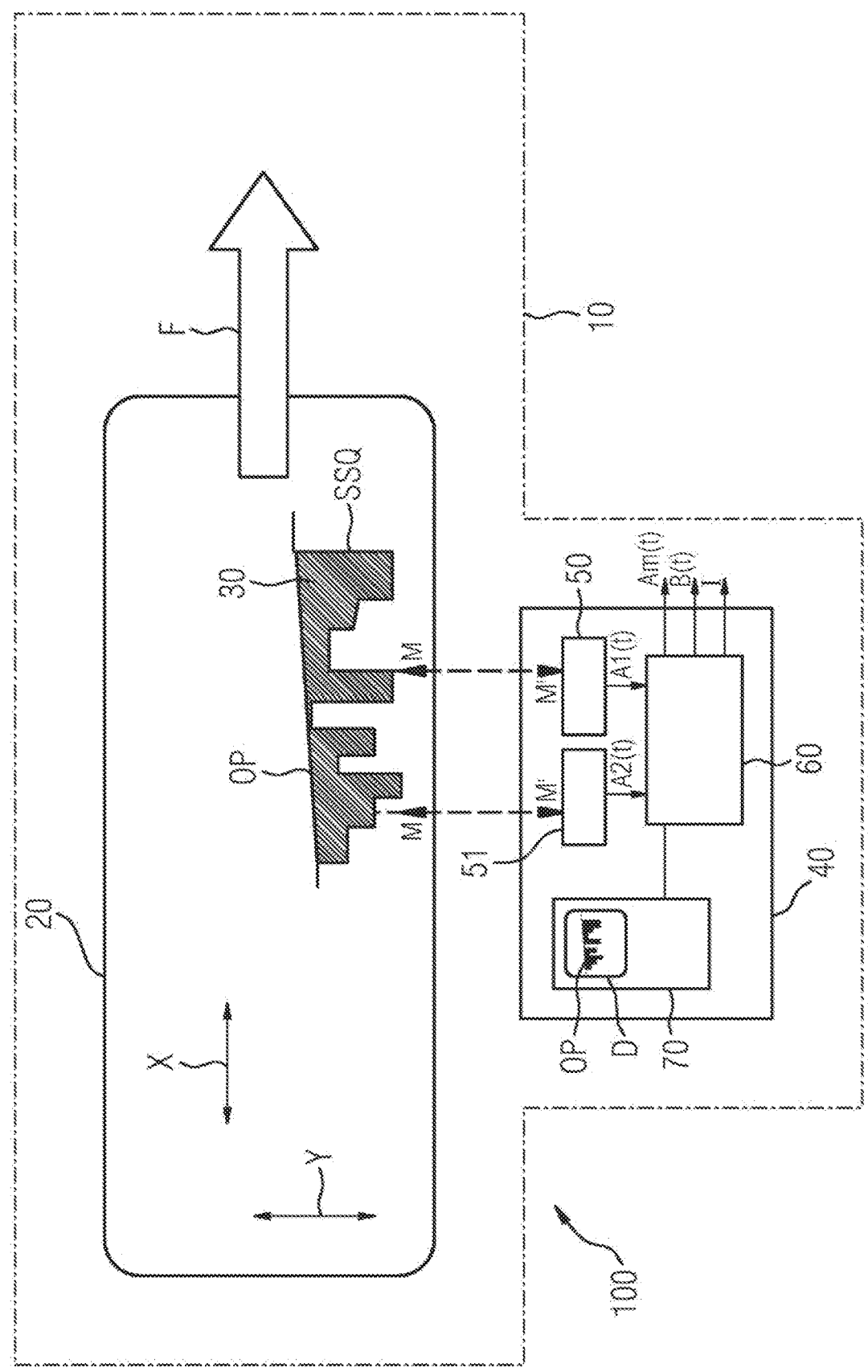
FIG. 4 shows an exemplary embodiment of a charging station according to the invention, in which a sensor device is equipped with two sensors which are arranged offset in the vehicle longitudinal direction.

FIG. 4 shows an exemplary embodiment of a charging station 10, in which a sensor device 40 is equipped with two sensors 50 and 51, which correspond in the function and operating principle thereof to the sensors 50 according to FIGS. 1 to 3.

The two sensors 50 and 51 each generate measuring beams M, receive measuring beams M', and are each capable of generating a distance signal $A1(t)$ or $A2(t)$, which indicates the respective distance of the sensor 50 or 51, respectively, from the vehicle-side marking 30.

The two distance signals $A1(t)$ and $A2(t)$ arrive at the computer device 60, which analyzes them and is capable, on the basis of the data set D or the surface profile OP stored therein, of carrying out positioning of the vehicle 20 both in the vehicle transverse direction Y (preferably in the form of a distance signal Am(t) averaged from the two distance signals $A1(t)$ and $A2(t)$) and also in the vehicle X direction.

An incorrect measurement or incorrect positioning of the vehicle 20 can be avoided in a particularly simple manner with the sensor device 40 according to FIG. 4, because a travel direction recognition of the vehicle 20 is additionally possible for monitoring by means of the two distance signals $A1(t)$ and $A2(t)$; because it may be readily recognized by simultaneously analyzing the two distance signals $A1(t)$ and $A2(t)$ in which travel direction F the vehicle 20 is moving at every point in time. If, after the vehicle 20 enters the charging station 10—for whatever reason—reverse travel occurs after a vehicle standstill, this can thus be recognized by the sensor device 40 and used for correcting the vehicle longitudinal direction signal B(t).

In particular in the case of buses for public transportation, it is not uncommon for the vehicle to be lowered and/or tilted when at a standstill to simplify the entry and exit of passengers. To also enable reliable recognition and read-out of the marking 30 in case of such lowering or tilting of the vehicle, it is considered to be advantageous if the surface topology of the marking 30 is bent about a bending axis, which corresponds to the vehicle longitudinal axis X or is parallel to the vehicle longitudinal axis X. A correct acquisition of the marking 30 may also be ensured in case of lowering or tilting of the vehicle by such a bend or curvature of the surface topology or the surface profile OP of the marking 30.

In addition, it is possible to provide further sensors in addition to the sensors 50 and 51 shown in FIGS. 1 to 4, which further sensors are arranged vertically offset and therefore can ensure detection of the marking 30 even if the vertical positioning of the marking 30 on the vehicle 20 is different than expected or, for example, is changed during the lowering or tilting of the vehicle 20 at a standstill.

The charging station 10 according to FIGS. 1 to 4 is equipped, in addition to the sensor device 40 described in detail, with the routine charging components, using which an energy accumulator of the vehicle 10 may be charged. Such charging components analyze the position indications of the sensor device 40 for the charging operation and are not shown in FIGS. 1 to 4 for the sake of comprehensibility.

A method 200 is provided for determining the position of a vehicle upon entering a charging station suitable for charging an energy accumulator of the vehicle. The method 200 includes a step 210 of: measuring, with a sensor device of the charging station, a distance between a vehicle-side marking and the sensor device of the charging station in a transverse direction of the vehicle and generating a distance signal indicating a distance between the sensor device of the charging station and at least one of the marking or the vehicle in a transverse direction of the vehicle, as the vehicle travels past the sensor device of the charging station. The method 200 includes a step 220 of: reading-out a marking property of the vehicle-side marking being dependent on a longitudinal direction of the vehicle and generating a longitudinal vehicle direction signal indicating a position of at least one of the marking or the vehicle relative to the sensor device of the charging station in the longitudinal direction of the vehicle. The method 200 includes a step 230 in which the marking property, which is dependent on the longitudinal direction of the vehicle, is determined by a surface profile of the marking in the transverse direction of the vehicle. The method 200 includes a step 240 in which the longitudinal vehicle direction signal is generated by analyzing the distance signal.

Although the invention was illustrated and described in greater detail by preferred exemplary embodiments, the invention is not thus restricted by the disclosed examples and other variations can be derived therefrom by a person skilled in the art, without leaving the scope of protection of the invention.

The invention claimed is:

1. A position determining system for determining the position of a vehicle upon entering a charging station suitable for charging an energy accumulator of the vehicle, the positioning system comprising:

a vehicle-side marking having at least one marking property changing in a longitudinal direction of the vehicle, wherein:

said at least one marking property is determined by a surface profile of the marking;

wherein said surface profile of said marking has a height that extends transversely with respect to the longitudinal direction of the vehicle, and said height changes along the longitudinal direction of the vehicle; and a route-side sensor device, said sensor device, as the vehicle travels past said sensor device:

measuring a distance between said marking and said sensor device and generating a distance signal indicating said distance between said marking and said sensor device, wherein said distance extends transversely with respect to the longitudinal direction of the vehicle, and reading-out said at least one marking property in the longitudinal direction of the vehicle and generating a longitudinal vehicle direction signal indicating a position of said marking or the vehicle relative to said sensor device in the longitudinal direction of the vehicle;

said longitudinal vehicle direction signal being generated by analyzing said distance signal.

2. The position determining system according to claim 1, wherein said at least one marking property has a marking end disposed in front in a forward travel direction of the vehicle, said front marking end has a starting feature or a starting sequence, and said sensor device recognizes a beginning of said marking traveling past based on said starting feature or a starting sequence.

3. The position determining system according to claim 1, wherein:

said marking has a coding identifying the vehicle; and said sensor device recognizes the vehicle based on said coding by analyzing said distance signal.

4. The position determining system according to claim 1, wherein said sensor device operates in a manner selected from the group consisting of optically, inductively, magnetically, and capacitively.

5. The position determining system according to claim 1, wherein said sensor device operates at least one of optically, inductively, magnetically or capacitively.

6. The position determining system according to claim 1, wherein said sensor device determines said distance between said marking and said sensor device by using triangulation, laser triangulation or radiation runtime.

7. The position determining system according to claim 1, wherein said height varies between more than two different height levels.

8. A charging station suitable for charging an energy accumulator of a vehicle, the charging station comprising:

a sensor device, said sensor device as the vehicle enters the charging station:

measuring a distance between a vehicle-side marking and said sensor device and generating a distance signal indicating said distance between said marking and said sensor device, wherein said distance extends transversely with respect to the longitudinal direction of the vehicle, and reading-out a marking property in a longitudinal direction of the vehicle and generating a longitudinal vehicle direction signal indicating a position of at least one of said marking or the vehicle relative to said sensor device in the longitudinal direction of the vehicle, wherein:

the marking property is determined by a surface profile of the marking, said surface profile has a height that extends transversely with respect to the longitudinal direction of the vehicle, and said height changes along the longitudinal direction of the vehicle; and the longitudinal vehicle direction signal is generated by analyzing the distance signal.

9. A vehicle, comprising:

at least one electric drive;

an energy accumulator being chargeable by a charging station having a sensor device; and a vehicle-side marking having a marking property being dependent on a longitudinal direction of the vehicle, said marking property forming a basis for generating:
- a longitudinal vehicle direction signal indicating a position of at least one of said marking or the vehicle relative to the sensor device in a longitudinal direction of the vehicle, and
- a distance signal indicating a distance between the sensor device and at least one of said marking or the vehicle, wherein said distance extends transversely with respect to the longitudinal direction of the vehicle;

wherein said marking property is a surface profile of said marking said surface profile has a height that extends transversely with respect to the longitudinal direction of the vehicle, and said height changes along the longitudinal direction of the vehicle wherein the longitudinal direction of the vehicle is a direction in which the vehicle longitudinally extends.

10. A method for determining the position of a vehicle upon entering a charging station suitable for charging an energy accumulator of the vehicle, the method comprising the following steps:

measuring, with a sensor device of the charging station, a distance between a vehicle-side marking and the sensor device of the charging station and generating a distance signal indicating a distance between the sensor device of the charging station and at least one of the marking or the vehicle, as the vehicle travels past the sensor device of the charging station, wherein said distance extends transversely with respect to the longitudinal direction of the vehicle; and reading-out a marking property of the vehicle-side marking being dependent on a longitudinal direction of the vehicle and generating a longitudinal vehicle direction signal indicating a position of at least one of the marking or the vehicle relative to the sensor device of the charging station in the longitudinal direction of the vehicle; wherein:

the marking property, which is dependent on the longitudinal direction of the vehicle, is determined by a surface profile of the marking, wherein said surface profile has a height that extends transversely with respect to the longitudinal direction of the vehicle, and said height changes along the longitudinal direction of the vehicle; and the longitudinal vehicle direction signal is generated by analyzing the distance signal.

* * * * *